United States Patent
Hosokawa et al.

(10) Patent No.: US 7,254,461 B2
(45) Date of Patent: Aug. 7, 2007

(54) NUMERICAL CONTROLLER HAVING A FUNCTION OF LEARNING CONTROL

(75) Inventors: Masahiko Hosokawa, Yamanashi (JP); Masafumi Sano, Yamanashi (JP); Iwao Makino, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/344,208

(22) Filed: Feb. 1, 2006

(65) Prior Publication Data
US 2006/0173571 A1 Aug. 3, 2006

(30) Foreign Application Priority Data
Feb. 2, 2005 (JP) ............................. 2005-026773

(51) Int. Cl.
*G06F 19/00* (2006.01)
(52) U.S. Cl. ...................................... 700/177; 700/173
(58) Field of Classification Search ........ 700/172–174, 700/177, 193
See application file for complete search history.

(56) References Cited

U.S. PATENT DOCUMENTS

| | | | |
|---|---|---|---|
| 6,903,527 B2 | 6/2005 | Toyozawa et al. | |
| 2004/0150363 A1* | 8/2004 | Toyozawa et al. | 318/568.13 |
| 2005/0085939 A1* | 4/2005 | Nakazato et al. | 700/173 |
| 2005/0256605 A1* | 11/2005 | Maeda et al. | 700/193 |

FOREIGN PATENT DOCUMENTS

| | | |
|---|---|---|
| EP | 1 441 270 | 7/2004 |
| EP | 1 577 725 | 9/2005 |
| JP | 6-309021 | 11/1991 |
| JP | 7-104823 | 4/1995 |
| JP | 2004-227163 | 8/2004 |

OTHER PUBLICATIONS

European Search Report, dated Jun. 19, 2006, for related European Patent Application No. EP06250557.3—2206.

* cited by examiner

*Primary Examiner*—Ryan A Jarrett
(74) *Attorney, Agent, or Firm*—Staas & Halsey LLP

(57) ABSTRACT

A numerical controller capable of checking a learning control execution interval for the entry of a command or signal that varies an operation pattern. The numerical controller reads machining programs in succession and sets a flag F to 1 until a learning control end command is read after a learning control start command is read. In a learning control interval during which the flag F is set to 1, it is determined whether or not an inappropriate command or signal is inputted during a learning process such that the operation pattern is varied. If it is concluded that such a command or signal is inputted, an alarm stop or feed hold stop is performed, the cause of stopping is displayed, and learning control is nullified. If any inappropriate command or signal is inputted during the learning process, the operation is stopped and the cause is displayed, so that the machining programs can be corrected with ease. Thus, wrong cutting or the like can be prevented from being caused by the learning control.

2 Claims, 2 Drawing Sheets

NUMERICAL CONTROLLER HAVING A FUNCTION OF LEARNING CONTROL

BACKGROUND OF THE INVENTION

1. Field of the Invention

The present invention relates to a numerical controller for controlling a machine tool, and more particularly to a numerical controller for performing a learning control function adopted when the same operation pattern is repeated for machining.

2. Description of Related Art

In performing machining or the like in response to repeated issuance of commands of the same pattern in a working machine, such as a machine tool that is controlled by a numerical controller, learning control is carried out as a known method to improve machining accuracy in which a control deviation is converged closed to zero. In this method, the same operation pattern is repeatedly ordered, and a memory is previously stored with correction data that is obtained based on a position deviation for each control period in the second latest operation pattern period. The position deviation is converged to zero by adding correction data of a control period corresponding to the second latest operation pattern period stored in the memory to the position deviation of each control period in the latest operation pattern period (e.g., JP 7-104823A and JP 6-309021A).

In another developed method (JP 2004-227163A), a learning control start command and a learning control end command are provided in advance in a machining program so that learning control is applicable to the case where a lot of identical components continue to be machined or the case where workpieces of the same machined shape are intermittently worked many times. The learning control is applied during a time interval from the issuance of the learning control start command to the issuance of the learning control end command. The correction data are created and the position deviation is corrected based on a position deviation obtained during that time interval.

The learning control is based on the assumption that commands of the same operation pattern are repeatedly issued and a command based on this same operation pattern is outputted for each given control period. Therefore, commands for each control period in the latest operation pattern period and the second latest operation pattern period are identical, and the correction data is obtained based on the position deviation for the second latest operation pattern period. The position deviation is finally controlled to be converged to 0 by adding the correction data corresponding to the latest control period to a position deviation in the latest period.

Therefore, the command for each control period after the start of operation of the same operation pattern must be identical with the command for the execution of the preceding operation pattern. If these commands are different, the learning control is insignificant and the position deviation cannot be converged.

The learning control is not applicable in the case where any commands that change the operation pattern are involved during the time interval from the issuance of the learning control start command to the issuance of the learning control end command. If the learning control is applied, these commands must be canceled. If operation based on commands and input signals that change the operation pattern is performed during the aforesaid start-to-end time interval, the learning control sometimes may cause the correction data to fail to be added to the position deviation, thereby rather entailing some wrong machining or operation.

Conventionally, however, this learning control interval is not checked at all on the assumption that any command or signal that changes the operation pattern cannot be inputted during that interval. Thus, wrong cutting or the like may be caused by false machining programs or inappropriate signal input.

SUMMARY OF THE INVENTION

The present invention provides a numerical controller capable of checking a learning control execution interval for the entry of a command or signal that varies an operation pattern.

A numerical controller of the present invention controls a servomotor to operate a machine, and has a function of learning control to obtain correction data based on position deviations during repetition of execution of the same operation pattern and correct position deviations in execution of the same operation pattern based on the obtained correction data. According to an aspect of the invention, the numerical controller comprises: monitoring means for monitoring program commands and input signals from start to end of the learning control so as to detect a program command or an input signal inappropriate for the learning control such that the operation pattern is varied; and stopping means for performing an alarm-stop of discontinuing the operation of the machine when the program command or the input signal inappropriate for the learning control is detected by the monitoring means.

According to another aspect of the invention, the numerical controller comprises: monitoring means for monitoring program commands and input signals from start to end of the learning control so as to detect a program command or an input signal inappropriate for the learning control such that the operation pattern is varied; and stopping means for performing a feed-hold stop of suspending the operation of the machine and nullifying the learning control when the program command or the input signal inappropriate for the learning control is detected by the monitoring means.

According to the above configurations, a machining program can be automatically checked to confirm if a command or a signal that changes the execution time and varies the operation pattern is inputted during the learning control to make correction of the machining program easy.

DETAILED DESCRIPTION

Figure 1:
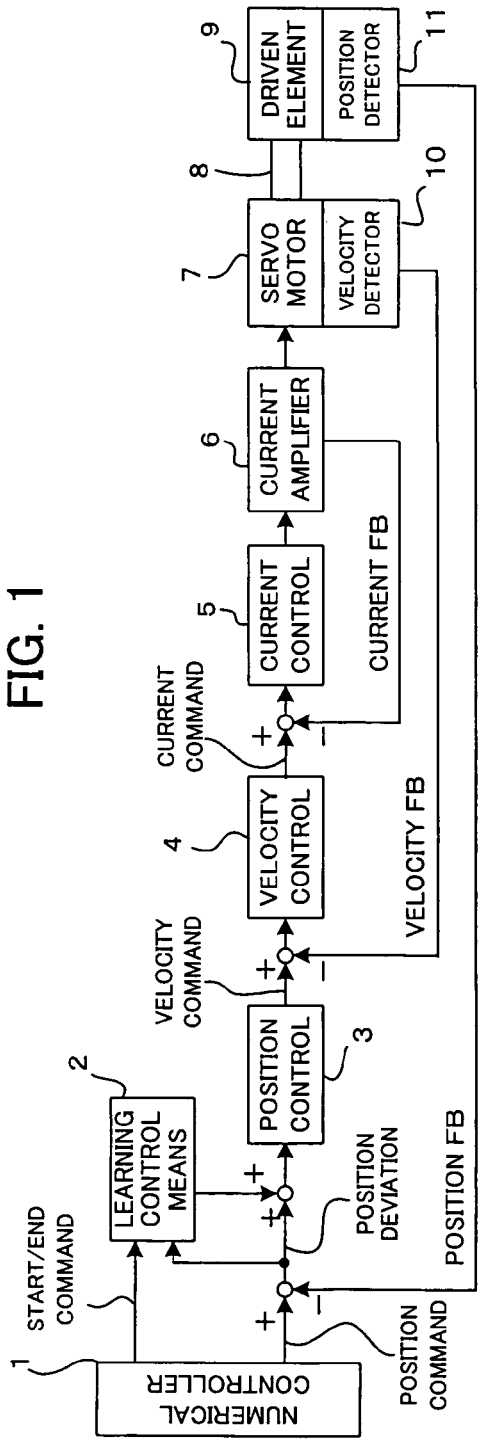
FIG. 1 is a schematic block diagram showing servo control to which is applied learning control performed by a numerical controller according to one embodiment of the present invention.

FIG. 1 is a schematic block diagram showing servo control to which is applied learning control performed by a numerical controller according to one embodiment of the present invention. Based on a machining program, a numerical controller 1 outputs a position command to a servo control section of a servomotor 7 for drivingly controlling a driven element 9. In the servo control section, the position, velocity, and current are feedback-controlled for each given control period in response to the position command, whereby the servomotor 7 is drivingly controlled.

More specifically, a present position fed back from a position detector 11 for detecting the moved position of the driven element 9 is subtracted from the position command outputted from the numerical controller 1, whereby a position deviation is obtained. In a position control section 3, a velocity command is obtained by multiplying the position deviation by a position loop gain. Further, a velocity deviation is obtained by subtracting an actual velocity fed back from a velocity detector 10, which is attached to the servomotor 7 and serves to detect its velocity, from the velocity command. A current command (torque command) is obtained by performing velocity loop control, such as PI (proportional-integral) control, in a velocity control section 4. Further, a current deviation is obtained by subtracting a drive current fed back from a current amplifier 6 from the current command, and current loop control is performed in a current control section 5. The servomotor 7 is drivingly controlled by the current amplifier 6, while the driven element 9 is driven by a transmission mechanism 8.

If a learning control start command is read from the machining program, the numerical controller 1 starts learning control. Correction data is added to the position deviation, position loop control is performed based on the corrected position command in the position control section 3, and correction data is created and stored in accordance with the position deviation. This learning control process is executed until a learning control end command is read.

Figure 2:
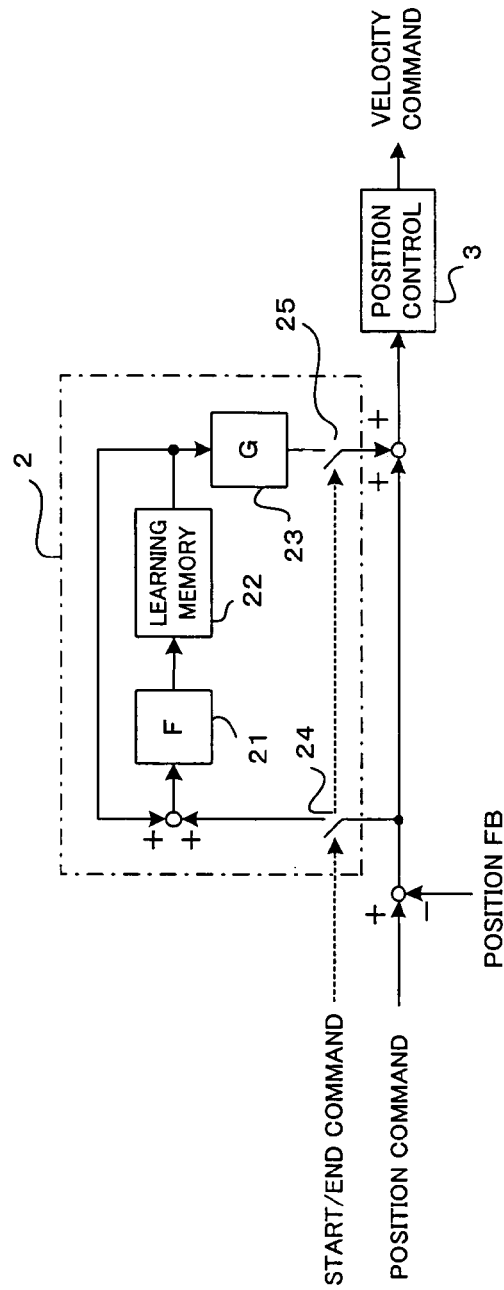
FIG. 2 is a detailed block diagram showing learning control means.

FIG. 2 is a detailed block diagram of learning control means 2. This learning control means 2 comprises a band limiting filter 21, learning memory means 22 for storing the correction data, and a dynamic characteristic compensation element 23 for compensating for a phase delay of a controlled object and gain reduction. Further, the learning control means 2 comprises switches 24 and 25 for starting and terminating the learning control. The learning memory means 22 is provided with memories as many as control periods in which position/velocity loop control is performed for the same operation command pattern to be learned. The number of the given control periods may be set in response to the learning control start command. If the given control period number is not set, a large enough value may be set for a first cycle so that the given control period number can be settled during a time interval (count number of given control periods) between start and end commands for the first cycle. When the correction data is transferred to or from a storage unit of a host control device, moreover, the given control periods can be transferred simultaneously. If an interval for the same operation command pattern and a position/velocity loop control period are L and T, respectively, for example, the learning memory means 22 is provided with an L/T number of memories.

When the learning control start command is outputted from the numerical controller 1, the switches 24 and 25 are closed, whereupon the learning control means 2 fetches the position deviation for each given period in which the position/velocity loop control is performed. The oldest correction data stored in the learning memory means 22 is added to this position deviation, and the resulting data is processed in the band limiting filter 21 and stored as correction data in the learning memory means 22. Further, the oldest correction data fetched from the learning memory means 22 is subjected to compensation for the phase delay of the controlled object and the gain reduction by the dynamic characteristic compensation element 23. The resulting correction data is added to the position deviation through the switch 25 and inputted to the position control section 3. The position deviation corrected by the addition of the correction data is multiplied by the position loop gain, whereby the velocity command is obtained. This processing operation is executed until the learning control end command is outputted from the numerical controller 1 to turn the switches 24 and 25 off after ordering the same command pattern is finished. Thereupon, the learning memory means 22 is stored with the correction data for each position/velocity control period in the same command pattern interval.

In the same command pattern interval, the correction data is added to the position deviation so that the position deviation is converged to zero.

The learning control is performed in this manner. If the learning memory means 22 is provided with an L/T number of memories, where L and T are the same operation command pattern interval and the position/velocity loop control period, respectively, therefore, a first learning memory is loaded with correction data for a first control period after the start of the learning control, a second learning memory with correction data for a second control period, and an n-th learning memory with correction data for an n-th control period. When the next learning control interval for the same command pattern is entered, the correction data is loaded into the learning memory corresponding to the control period concerned in like manner, and the previously stored correction data is read out and corrected by the position deviation. Thus, the correction data stored in the first learning memory is added to the position deviation in the first control period after the start of the learning control, the correction data stored in the second learning memory is read out and added to the position deviation in the second control period, and the correction data stored in the n-th learning memory is added to the position deviation in the n-th control period.

If the machining program contains commands for changing the execution time and varying the operation pattern, e.g., an auxiliary function command associated with a PC, etc., or an override signal, feed hold stop signal, and single block signal for the feed speed are inputted during the learning control interval concerned, however, the relationship between the correction data stored in the learning memory and the control period in the learning control interval is broken. In consequence, the corresponding correction data cannot be added to the position deviation for the command, so that the pattern varies, resulting in wrong cutting.

Accordingly, the present invention is configured to check the learning control interval for the input of a command or signal that varies the operation pattern.

Figure 3:
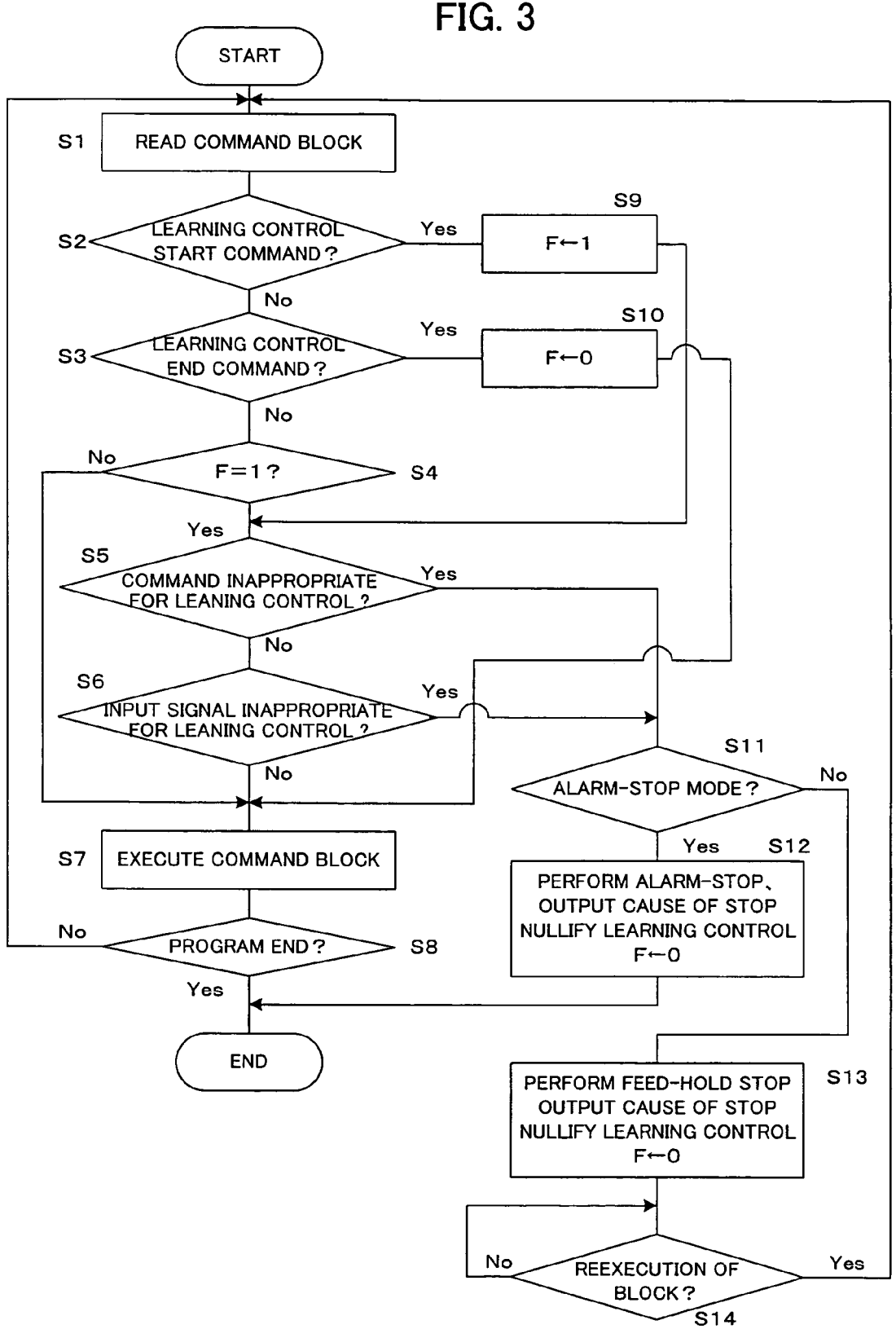
FIG. 3 is a flowchart showing program check processing executed by the numerical controller according to the one embodiment of the invention.

The numerical controller 1 is constructed substantially in the same manner as a conventional one, and its novelty lies in that it is provided with software for checking learning control interval signals or commands shown in FIG. 3 so that the machining program can be checked by executing the software. Since the hardware configuration of the numerical controller 1 is the same as that of the conventional one, a description thereof is omitted.

If a machining program check command is inputted, a processor of the numerical controller 1 starts the processing shown in FIG. 3. It reads one command block from the top of the machining program (Step S1) and determines whether the command of the read block is the learning control start command (Step S2) or the learning control end command (Step S3). If the command is neither of them, it is determined whether or not a flag F indicative the execution of the learning control is set to 1 (Step S4). If the flag F is not set to 1, the procedure proceeds to Step S7, in which the read block command is executed. Then, it is determined whether or not this block command is a program end command (Step S8). If the command is not the end command, the procedure returns to Step S1.

Thereafter, command programs are successively read out from the top of the machining program and the aforementioned processing is executed. When the learning control start command is read out, the procedure proceeds from Step S2 to Step S9, in which the flag is set to 1. Thereupon, the procedure proceeds to Step S5, in which it is determined whether or not the read block command during the learning process is an inappropriate command, that is, a command that varies the operation pattern. If the block command is not an inappropriate command, it is determined whether or not an inappropriate signal is inputted during the learning process (Step S6). Thus, as mentioned before, it is determined whether or not a signal that varies the operation pattern, such as the override signal, feed hold stop signal, single block signal, etc., is inputted. If no inappropriate signal is inputted either, the read block command is executed (Step S7). If the program is not terminated (Step S8), the procedure returns to Step S1.

After the flag F is set to 1, the procedure proceeds from Step S4 to Step S5, in which it is determined whether or not an inappropriate command or signal is inputted during the learning process. If no inappropriate command or signal is inputted, the read block command is executed. If the program is not terminated, the procedure returns to Step S1. Thereafter, the processes of Steps S1 to S8 are repeatedly executed so that the learning control end command is read out.

If the learning control end command is read out, the procedure proceeds from Step S3 to Step S10, in which the flag F is set to 0. Thereupon, the procedure proceeds to Step S7.

Since the flag F is set to 0, the processes of Steps S1 to S4 and Steps S7 and S8 are executed thereafter. When the learning control start command is read out again, the flag F is set to 1, and processing is performed to determine whether or not an inappropriate command or signal is inputted during the learning process. If the program end command is read (Step S8), moreover, this program check processing terminates.

If it is concluded in Step S5 and S6 that any inappropriate command or signal is inputted during the learning control interval, on the other hand, the procedure proceeds to S11, in which it is determined whether or not an alarm-stop mode is set in advance. If the alarm-stop mode is set, an alarm-stop signal is issued to discontinue the operation, and a message that an inappropriate command or signal is inputted during the learning process to be stopped by the alarm is displayed on a screen of a display device that is attached to the numerical controller 1. Further, the learning control is nullified, all the correction data stored in the learning memory means 22 of the learning control means 2 are cleared, and the flag F is set to 0 (Step S12), whereupon this program check processing terminates.

If the alarm stop mode is not set, on the other hand, the procedure proceeds from Step S11 to Step S13, in which feed-hold stop is performed to suspend the operation of the machine, and a message that an inappropriate command or signal is inputted during the learning process to be stopped is displayed on the screen of the display device of the numerical controller 1. Further, the learning control is nullified, all the correction data stored in the learning memory means 22 of the learning control means 2 are cleared, and the flag F is set to 0. Then, entry of a block rerun command is awaited (Step S14). If the block rerun command is inputted, the procedure returns to Step S1, in which the machining program check processing is continued.

If the machining program check thus indicates that an inappropriate command or signal is inputted such that the operation pattern changes during the learning process in a specified learning control interval, the checking operation is stopped, the message to the effect that the inappropriate command or signal is inputted, the learning control is nullified, and all the correction data for the learning control are cleared. Thus, the machining program can be easily corrected, and the cause of wrong cutting attributable to the learning control can be quickly eliminated.

What is claimed is:

1. A numerical controller for controlling a servomotor to operate a machine, having a function of learning control to obtain correction data based on position deviations during repetition of execution of the same operation pattern and correct position deviations in execution of the same operation pattern based on the obtained correction data, said numerical controller comprising:

monitoring means for monitoring program commands and input signals from start to end of the learning control so as to detect a program command or an input signal inappropriate for the learning control such that the operation pattern is varied; and stopping means for performing an alarm-stop of discontinuing the operation of the machine when the program command or the input signal inappropriate for the learning control is detected by said monitoring means.

2. A numerical controller for controlling a servomotor to operate a machine, having a function of learning control to obtain correction data based on position deviations during repetition of the same operation pattern and correct position deviations during the same operation pattern based on the obtained correction data, said numerical controller comprising:

monitoring means for monitoring program commands and input signals from start to end of the learning control so as to detect a program command or an input signal inappropriate for the learning control such that the operation pattern is varied; and stopping means for performing a feed-hold stop of suspending the operation of the machine and nullifying the learning control when the program command or the input signal inappropriate for the learning control is detected by said monitoring means.

* * * * *

UNITED STATES PATENT AND TRADEMARK OFFICE
CERTIFICATE OF CORRECTION

PATENT NO. : 7,254,461 B2  Page 1 of 1
APPLICATION NO. : 11/344208
DATED : August 7, 2007
INVENTOR(S) : Masahiko Hosokawa et al.

It is certified that error appears in the above-identified patent and that said Letters Patent is hereby corrected as shown below:

Drawing Sheet 2 of 2 (Referral number S5) (FIG. 3), Line 2, change "LEANING" to --LEARNING--.

Drawing Sheet 2 of 2 (Referral number S6) (FIG. 3), Line 2, change "LEANING" to --LEARNING--.

Signed and Sealed this

Twenty-ninth Day of April, 2008

JON W. DUDAS
*Director of the United States Patent and Trademark Office*